Patented Oct. 16, 1928.

1,687,903

UNITED STATES PATENT OFFICE.

OMAR H. SMITH, OF NEW YORK, N. Y., ASSIGNOR TO THE NAUGATUCK CHEMICAL COMPANY, OF NAUGATUCK, CONNECTICUT, A CORPORATION OF CONNECTICUT.

METHOD FOR THE PRODUCTION OF STYROL FROM CHLOR ETHYL BENZOL.

No Drawing.   Application filed October 4, 1927.   Serial No. 224,024.

This invention relates to a new method of producing styrols from halogen containing alkyl benzols. More specifically the invention relates to a new method of making styrols by the pyrogenic decomposition or dehydrogenation of halogen alkyl benzols.

The production of styrol from ethyl benzol by pyrogenic dehydrogenation is not new. Nor is it new to produce styrol by a reaction between alpha chlor ethyl benzol or alpha from ethyl benzol and a base such as quinoline or piperidine. On the other hand, the production of styrol by the pyrogenic dehydrogenation of a halogen ethyl benzol or alkyl benzol has never been described in the literature, either as applied to the alpha or beta halogen alkyl benozls or to the ortho, meta, and para halogen alkyl benzols, the latter group of compounds being those which contain the halogen atom in the nucleus.

The primary object of the invention is to provide a new method for the production of styrols from halogen alkyl benzols. A further object is to produce styrol from such compounds by pyrogenic dehydrogenation. A further object is to provide a process for producing styrols which shall be highly productive and efficient.

Without intention to place limitations upon the scope of the invention beyond what may be required by the prior art, the invention briefly stated consists in subjecting a halogen alkyl benzol to temperatures sufficiently high to split off hydrogen and chlorine, and recovering styrol from the products of this pyrogenic decomposition. The invention also includes the preliminary formation of halogen alkyl benzols by halogenation of an alkyl benzol or by ethylation of a halogen benzol. More specifically the invention consists in subjecting chlor ethyl benzol to elevated temperatures, splitting off hydrogen and chlorine and recovering styrol from the products of the decomposition. And the invention includes the preliminary formation of chlor ethyl benzol by chlorination of ethyl benzol or by the ethylation of chlor benzol.

To illustrate the invention as applied to the production of styrol from alpha chlor ethyl benzol, the following is given: A quantity of ethyl benzol is treated with chlorine preferably below 30° C., whereby alpha chlor ethyl benzol together with a smaller amount of beta chlor ethyl benzol are formed, the chlorine treatment being continued until the ethyl benzol has absorbed approximately ⅓ Mol. of chlorine. Without separating the two chlor benzols they are passed through a cracking tube heated to 675–700° C. Here the chlor benzols are dehydrogenated or decomposed into styrol and hydrochloric acid as the main products, with residual ethyl benzol and other hydro carbons forming by-products, mostly in the shape of a tar.

An iron tube or a nichrome tube may be used as the cracking or dehydrogenating tube. Nichrome is probably preferable on account of its greater resistance to the hydrochloric acid which is liberated in the process. The tube may be heated by an electric furnace or in any other suitable way. Preferably the tube is "swept out" with a current of carbon dioxide prior to the introduction of chlor ethyl benzols. The liquid products of the pyrogenic decomposition may be condensed and collected in the usual way, with customary apparatus, and the residual gases may be disposed of as desired. A desirable rate of feed for the chlor ethyl benzols is 90 grams per hour with a cracking tube 3 feet long and ¾ inch inside diameter. It is of course understood that the temperature of the cracking or dehydrogenation will be dependent somewhat upon the rate of feed, the higher the rate of feed, the higher the temperature. Preferably, the temperatures lie within the approximate limits 500° C. and 725° C.

The liquid products collected after the decomposition are then steam distilled to separate the styrol, ethyl benzol, and other hydrocarbons from the tar. The steam distillate may then be dried, polymerized in a sealed tube, and the polymer then subjected to further steam distillation to separate polymerized styrol from the steam-volatile hydrocarbons. Instead of this treatment of the liquid condensate obtained after cracking any other purification or recovery may be applied to remove the styrol from the other products.

The reaction probably takes the following course:

$$C_6H_5CHClCH_3 \rightarrow C_6H_5CH:CH_2 + HCl$$

The above is illustrative of the reaction as applied to chlor ethyl benzols. The process may also be applied to brom ethyl benzols and to other halogen alkyl benzols, it being understood that as the alkyl groups increase in number, homologues of styrol or alkyl styrols will be formed.

Styrol may also be obtained from halogen alkyl benzols where the halogen atom is located directly on the benzene ring. For example styrol may be obtained by using a mixture of ortho, meta and para chlor ethyl benzols and substituting this mixture for the alpha chlor ethyl benzol in the above example.

The ortho, meta and para chlor ethyl benzols may be prepared in any desired manner. For example, chlor benzol may be ethylated in the presence of aluminum chloride, this reaction proceeding much more rapidly than the ethylation of benzol under similar conditions. A current of ethylene may be passed into chlor benzol containing 5% by weight of anhydrous aluminum chloride, the reaction mixture being maintained at a temperature below 90° C. During the ethylation process the mixture is stirred, and a reflux condenser or its equivalent is provided to prevent evaporation of the chlor benzol. An approximately equi-molecular amount of ethylene may be passed into the chlor benzol at the maximum rate permissible without allowing too much of the gas to pass through the solution without being absorbed. When the ethylation process is completed, and reaction mixture is steam distilled, and the products separated by fractionation in vacuum. At a pressure of 5 cm. it will be found that the greater part of the chlor ethyl benzols are contained in the 90–105° fraction.

This fraction, containing a mixture of ortho, meta, and para chlor ethyl benzols, the meta compounds predominating, is passed through a hot tube, and under the same reaction conditions and temperatures as has been previously described for alpha chlor ethyl benzol. The cracked products include halogen acids, styrol, and some unchanged chlor ethyl benzols along with other by-products. The liquid reaction products obtained by condensation are steam distilled, dried, polymerized, and the impure polymer further distilled to separate the polymerized styrol from steam volatile hydrocarbons. The remaining fractions may be returned to the process to be used over again in conjunction with fresh chlor benzol for a subsequent treatment. It is of course understood that instead of steam distillation, polymerization, distillation of the polymer, other method of recovering or purifying the styrol may be employed. The "polymerization" method herein described is one convenient way of accomplishing the desired purification of the styrol.

The reaction is similar to that described above for alpha chlor ethyl benzol with the exception that the chlorine atom splits off of the benzene ring instead of the side chain.

While the invention has been illustrated with chlor benzols, it is of course understood that other halogen alkyl benzols of the same type where the halogen appears on the benzene ring instead of on the side chain may be substituted for the chlor ethyl benzols.

According to the herein described process for obtaining styrol from halogen alkyl benzols, it is possible to obtain styrol in greater concentration in the same distillate than is possible when ethyl benzol alone is cracked to form styrol. Furthermore the productivity of the reaction is considerably greater than for ethyl benzol alone. Productivity is used to designate the percentage between the styrol produced and the chlor benzol passed through the tube.

Having thus described my invention what I claim and desire to protect by Letters Patent is:

1. A method of producing styrol which comprises subjecting halogen containing alkyl benzols to decomposition temperatures, thereby splitting off hydrogen and halogen, collecting the liquid reaction products, and recovering styrol therefrom.

2. A method of producing styrol which comprises subjecting halogen containing alkyl benzols to temperatures between approximately 500° and 725° C., collecting the liquid reaction product, and separating styrol therefrom.

3. A method of producing styrol which comprises subjecting halogen containing alkyl benzols to temperatures between approximately 500° and 725° C., collecting the liquid reaction product, separating styrol and other hydrocarbons from the liquid reaction products by distillation, and recovering styrol from the distillate.

4. A method of producing styrol which comprises cracking halogen containing ethyl benzols at temperatures between 500°–725° C., collecting the liquid reaction products, heating to separate styrol, ethyl benzol and other hydrocarbons from the liquid reaction products, drying the styrol thus partially purified, polymerizing and heating the crude polymer to free it from the impurities present.

5. A method of producing styrol which comprises cracking chlor ethyl benzols at temperatures between 500–725°, collecting the liquid reaction products, heating to separate styrol, ethyl benzol and other hydrocarbons from the liquid reaction products, drying the styrol thus partially purified, polymerizing and heating the crude polymer to free it from the impurities present.

6. A method of producing styrol which comprises cracking chlor ethyl benzols at temperatures between approximately 600° and 725°, collecting the liquid reaction products, steam distilling said products to separate the styrol, ethyl benzol and other hydrocarbons therefrom, drying the styrol containing distillate, polymerizing the styrol, and heating the polymer to remove non-styrol hydrocarbons, and recovering a purified styrol.

7. A method of producing styrol which comprises cracking chlor ethyl benzols at temperatures between approximately 600° and 725°, collecting the liquid reaction products, steam distilling said products to separate the styrol, ethyl benzol and other hydrocarbons therefrom, drying the styrol containing distillate, polymerizing the styrol, steam distilling the crude polymer to remove steam-volatile hydrocarbons, and recovering a purified styrol.

Signed at New York, county and State of New York, this 27th day of September, 1927.

OMAR H. SMITH.

CERTIFICATE OF CORRECTION.

Patent No. 1,687,903.  Granted October 16, 1928, to

OMAR H. SMITH.

It is hereby certified that error appears in the printed specification of the above numbered patent requiring correction as follows: Page 1, line 11, for the word "from" read "brom"; and that the said Letters Patent should be read with this correction therein that the same may conform to the record of the case in the Patent Office.

Signed and sealed this 27th day of November, A. D. 1928.

M. J. Moore,
Acting Commissioner of Patents.

(Seal)

carbons therefrom, drying the styrol containing distillate, polymerizing the styrol, and heating the polymer to remove non-styrol hydrocarbons, and recovering a purified styrol.

7. A method of producing styrol which comprises cracking chlor ethyl benzols at temperatures between approximately 600° and 725°, collecting the liquid reaction products, steam distilling said products to separate the styrol, ethyl benzol and other hydrocarbons therefrom, drying the styrol containing distillate, polymerizing the styrol, steam distilling the crude polymer to remove steam-volatile hydrocarbons, and recovering a purified styrol.

Signed at New York, county and State of New York, this 27th day of September, 1927.

OMAR H. SMITH.

CERTIFICATE OF CORRECTION.

Patent No. 1,687,903.     Granted October 16, 1928, to

OMAR H. SMITH.

It is hereby certified that error appears in the printed specification of the above numbered patent requiring correction as follows: Page 1, line 11, for the word "from" read "brom"; and that the said Letters Patent should be read with this correction therein that the same may conform to the record of the case in the Patent Office.

Signed and sealed this 27th day of November, A. D. 1928.

M. J. Moore,
Acting Commissioner of Patents.

(Seal)